June 14, 1932.  K. E. PEILER  1,862,979
GLASS SEVERING APPARATUS
Filed Nov. 16, 1928
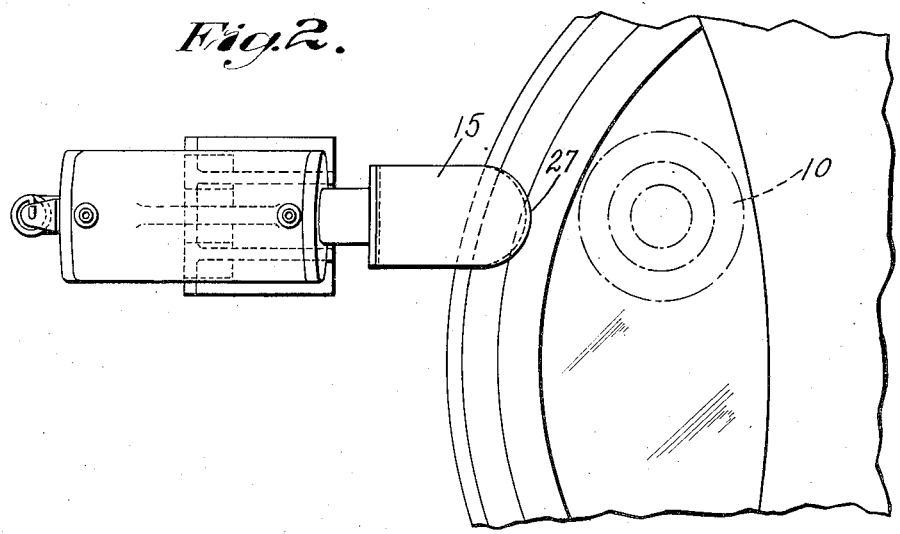
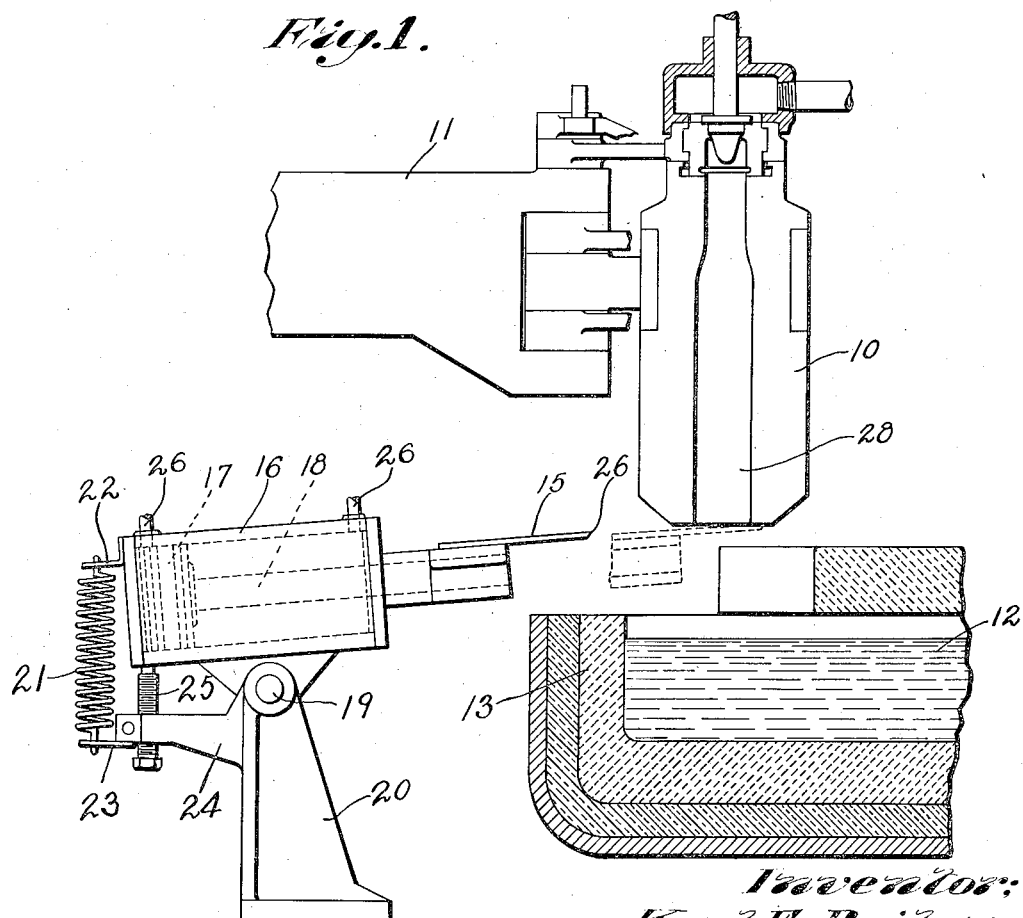

Patented June 14, 1932

1,862,979

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

GLASS SEVERING APPARATUS

Application filed November 16, 1928. Serial No. 319,915.

My invention relates to the art of separating mold charges of molten glass from a supply in a tank or pool which charges are gathered by means of molds or feeding cups that are brought into contact with the surface of the glass and are charged with glass by suction produced in the molds or cups.

The object of my invention is to improve the severing operation whereby the glass in the gathering receptacle is separated from the general supply of glass after the receptacle has been charged and lifted above the glass.

In carrying out my invention, I provide a shear blade having a curved cutting edge, and I apply the curved edge of the shear blade to the bottom of the gathering receptacle in such a way that the cutting edge of the shear blade and the bottom of the gathering cavity in the receptacle engage each other during the cutting operation at two points only. This is accomplished by inclining the shear blade upwardly with respect to the bottom of the receptacle and by so arranging the mechanism that the shear blade is enabled to adapt itself yieldingly to the bottom of the mold or of the receptacle. The glass is cut cleanly and without smearing, since the cutting edge of the shear blade is in firm contact with the lower inside edge of the mold during the cutting operation at only those points where shearing is taking place. Moreover, only the cutting edge of the shear blade contacts with the glass and that only for the short duration of the cutting operation. This minimizes chilling of the glass and overheating of the shear blade.

This arrangement is an improvement on the ordinary shearing mechanism, such as is employed, for example, in the well-known Owens bottle machine, wherein each gathering mold of the machine is provided with an individual knife which moves horizontally across the bottom of the mold in flat engagement with the mold bottom, thus tending to smear the glass, and which is in chilling contact with the glass for an appreciable time.

In the accompanying drawing:

Figure 1 is a side view, partly in elevation and partly in vertical section, of a portion of a system of glass-working apparatus embodying my invention; and Fig. 2 is a plan view of the apparatus shown in Fig. 1.

Referring to the drawing, the numeral 10 indicates a parison mold of the suction type, such as is employed in the ordinary Owens bottle machine, this mold being carried by a head 11 by which the mold may be lowered into contact with a gathering pool of molten glass 12 contained in a refractory receptacle 13, which may be a rotary tank or pot, such as is used with the Owens machine, or may be any other suitable container for a supply of molten glass. The construction of the mold and the arrangements for opening and closing the mold, for presenting it to the gathering pool, and for producing suction in the mold to gather the glass, form no part of my present invention.

After the mold is lowered into contact with the glass, charged by suction and then lifted, the glass is severed, according to my present invention, by an upwardly inclined shear blade 15 which is projected to sever the glass, and then retracted to a position removed from the hot zone above the glass, by means of a fluid-pressure mechanism including a cylinder 16 containing a piston 17 and a piston rod 18, the outer end of which carries the shear blade 15. The cylinder 16 is pivotally mounted at 19 on a stationary support 20 and is yieldingly held in an inclined position, as shown in Fig. 2, by means of a spring 21 extending between a bracket 22 on the cylinder 16 and a bracket 23 on an arm 24 extending from the support 20. The degree of inclination of the cylinder 16, and consequently of the shear blade 15, is determined by a stop screw 25 extending through the arm 24, and supporting the outer end of the cylinder 16 when the shear is in the retracted position shown in Fig. 1.

Fluid pressure is introduced into the cylinder 16 through pipes 26 and the admission and exhaust of fluid may be timed and controlled by any suitable mechanism, not shown.

The cutting edge 27 of the blade 15 is preferably curved, as shown in Fig. 2, so as to insure a two-point contact between the blade and the lower edge of the mold cavity 28 while the shear blade is severing the glass.

In operation, the mold 10 is lowered into contact with the glass, charged by suction and lifted to a position above the glass, about as shown in Fig. 1, whereupon pressure fluid is admitted to the rear of the cylinder 16 and projects the piston 17 and the shear blade 15, which first engages the bottom of the mold 10 with a yielding upward pressure produced by the spring 21. Then, as the shear blade is further projected, the curved cutting edge 27 slides across the bottom of the mold cavity 28 and severs the glass quickly, cleanly and without unduly chilling the glass or smearing it, the blade being in contact with the glass only at the cutting edge and for a minimum time. As before stated, the contact between the curved cutting edge and the bottom of the mold cavity is at two points only during the cutting operation. The shear blade is able to tilt laterally to conform to the bottom of the mold, if the position of the mold or of the shear blade renders such tilting necessary. On account of the upward inclination of the shear blade and its curved cutting edge, the cut surface of the glass is very slightly convex at the bottom of the mold. This prevents the formation below the mold of a protruding stub of chilled glass.

I have shown my invention as applied to an arrangement in which a shear blade is projected and retracted, the glass being cut by the projecting movement of the blade and the reverse movement bringing the blade to a relatively cool position, removed from the hot zone above the surface of the glass. This arrangement may obviously be varied by causing the shear blade to be fixed in a projected position during the severing movement, and producing the severing movement by travel of the mold across the shear blade.

My invention has been described particularly in connection with a gathering mold, but it will be understood that my invention applies equally well to severing glass collected by cups or other receptacles which are charged from the surface of a glass supply and thereafter deposit the charges in molds. It will also be understood that various modifications may be made in the structure herein disclosed within the scope of the appended claims.

I claim as my invention:

1. In combination, a receptacle for segregating mold charges of molten glass by suction, a shear blade, a fluid-pressure cylinder having a piston and a piston rod which carries said shear blade, means for pivotally mounting said cylinder, a spring tending to incline said shear blade upwardly, and means for regulating the inclination of said cylinder and said shear blade.

2. In combination, a receptacle for segregating mold charges by suction, a shear blade, mechanism for projecting and retracting said shear blade toward and away from said receptacle, and for carrying said shear blade, stationary means for pivotally mounting said mechanism for tipping movement, a spring for yieldingly holding said mechanism and shear blade upwardly inclined at all times on the pivotal mounting means, and a stop for limiting the upward inclination of said mechanism and shear blade.

3. In combination, a receptacle for segregating mold charges by suction, a shear blade, mechanism for projecting and retracting said shear blade toward and away from said receptacle, and for carrying said shear blade, means for pivotally mounting said mechanism for tipping movement, a spring for yieldingly holding said mechanism and shear blade upwardly inclined, and an adjustable stop engaging said mechanism for limiting the upward inclination thereof and of said shear blade.

4. In combination, a receptacle for segregating mold charges by suction, a shear blade, mechanism for projecting and retracting said shear blade toward and away from said receptacle, and for carrying said shear blade, stationary means upon which said mechanism is pivotally mounted for tipping movement, means for yieldingly holding both said mechanism and shear blade in upwardly inclined positions at all times, and means for limiting the upward inclination of said mechanism and shear blade.

5. In combination, a receptacle for segregating mold charges by suction, a shear blade, mechanism for projecting and retracting said shear blade toward and away from said receptacle, and for carrying said shear blade, stationary means for pivotally mounting said mechanism for tipping movement, means for yieldingly holding both said mechanism and shear blade in upwardly inclined positions, whereby upon operation of said mechanism, said shear blade is moved upwardly into engagement with said receptacle and downwardly out of engagement therewith, and said shear blade is depressed by engagement with said receptacle, and means for limiting the upward inclination of said mechanism and shear blade.

6. Glassware forming apparatus comprising a suction mold, a support by means of which said mold is moved into and out of contact with the surface of a gathering pool, and glass severing mechanism comprising a stationary support, an air motor pivoted from beneath on said support for tilting movements, a shear blade carried and operated by said air motor, yielding means for holding the air motor and shear blade in upwardly tilted position at all times, whereby operation of the air motor projects the shear blade upwardly into engagement with the receptacle and the air motor and shear blade are pressed downwardly by movement of the shear blade across the bottom of the receptacle, said air motor and shear blade being free to be returned to their initial upwardly tilted position by the yielding means after disengagement of said shear blade and receptacle, and means for predetermining the initial angle of tilt of said shear blade and air motor.

Signed at Hartford, Connecticut, this 7th day of November, 1928.

KARL E. PEILER.